(12) United States Patent
Lin (10) Patent No.: US 6,343,926 B1
(45) Date of Patent: Feb. 5, 2002

(54) INJECTION MOLD MACHINE HAVING PARALLEL FORMING PLATES

(76) Inventor: Jin-Shu Lin, Building 7, Lane 8, Xiang 152, Duan5, Nan Zhu Road, Lu ZhuCountry, Tao Yuan Hsien (TW)

( * ) Notice: Subject to any disclaimer, the term of this patent is extended or adjusted under 35 U.S.C. 154(b) by 0 days.

(21) Appl. No.: 09/530,820

(22) PCT Filed: Nov. 14, 1997

(86) PCT No.: PCT/CN97/00127
§ 371 Date: May 4, 2000
§ 102(e) Date: May 4, 2000

(87) PCT Pub. No.: WO99/25925
PCT Pub. Date: May 27, 1999

(51) Int. Cl.[7] .............................................. B29C 45/12
(52) U.S. Cl. ........................ 425/572; 425/338; 425/588
(58) Field of Search ................................ 425/572, 588, 425/338

(56) References Cited

U.S. PATENT DOCUMENTS

| 4,753,592 | A | * | 6/1988 | Kaaden | 425/572 |
| 4,884,962 | A | * | 12/1989 | Sheffield | 425/572 |
| 5,846,472 | A | * | 12/1998 | Rozema et al. | 425/572 |
| 6,171,094 | B1 | * | 1/2001 | Von Holdt | 425/588 |

* cited by examiner

Primary Examiner—Tim Heitbrink
(74) Attorney, Agent, or Firm—Pro-Techtor International Services (57) ABSTRACT

The present invention relates to a plate type of continuous injection mold machine consisting of several forming plates for injection that are arranged upright and parallel to one another on an elongated frame. Each forming plate has hollow mold inside. When the plates are pressed to be adjacent to one another and the material is injected via the inlet pipe, the material such as pulp and plastics will fill up all space of the forming plates. As the injection of material continues, the material will be pressed and hydrated. When the forming plates are separated, a large number of molded products will be obtained simultaneously.

6 Claims, 13 Drawing Sheets

INJECTION MOLD MACHINE HAVING PARALLEL FORMING PLATES

BACKGROUND OF THE INVENTION

1. Field of the Invention

The present invention relates to a plate type of continuous injection mold machine, which is capable of manufacturing a large number of pulp or plastic products simultaneously. The present invention consists of plural forming plates for injection that are arranged upright and parallel to one another on an elongated frame. All forming plates comprise hollow molds inside, and the hollow molds are adjacent to one another. When the forming plates are pressed towards one another, the material is injected continuously into the molds through the inlet pipe and fills up the space of hollow molds in the forming plates. Then the material is compactly pressed and dehydrated until the shape of products is created; and thus a large amount of molded products can be manufactured at same time.

2. Description of the Prior Art

The present invention is a plate type of continuous injection mold machine consisting of several forming plates with hollow molds inside arranged upright and parallel to one another, and all hollow molds are adjacent to one another. The material pulp is injected via the inlet pipe on one end of the machine and fills up the space in the forming plates, then the material is compactly pressed and dehydrated until the process of forming is completed; and thus produce a large amount of products with desired shape.

SUMMARY OF THE INVENTION

The televisions, stereo-sets, air-conditioners and computer equipment are packed with polyester or paper cushions between the products and the boxes in order to protect the products from being damaged in the shipment. Normally, the polyester and paper cushions are made by single machine as single products. The cost is high and production volume is minimal. The present invention is designed to produce huge quantity of identical products at lower costs.

The advantages of present invention will be justified after reading the detailed description of the preferred embodiments of the present invention in reference to the accompanying drawings, wherein:

DETAILED DESCRIPTION OF THE PREFERRED EMBODIMENT

Figure 1:
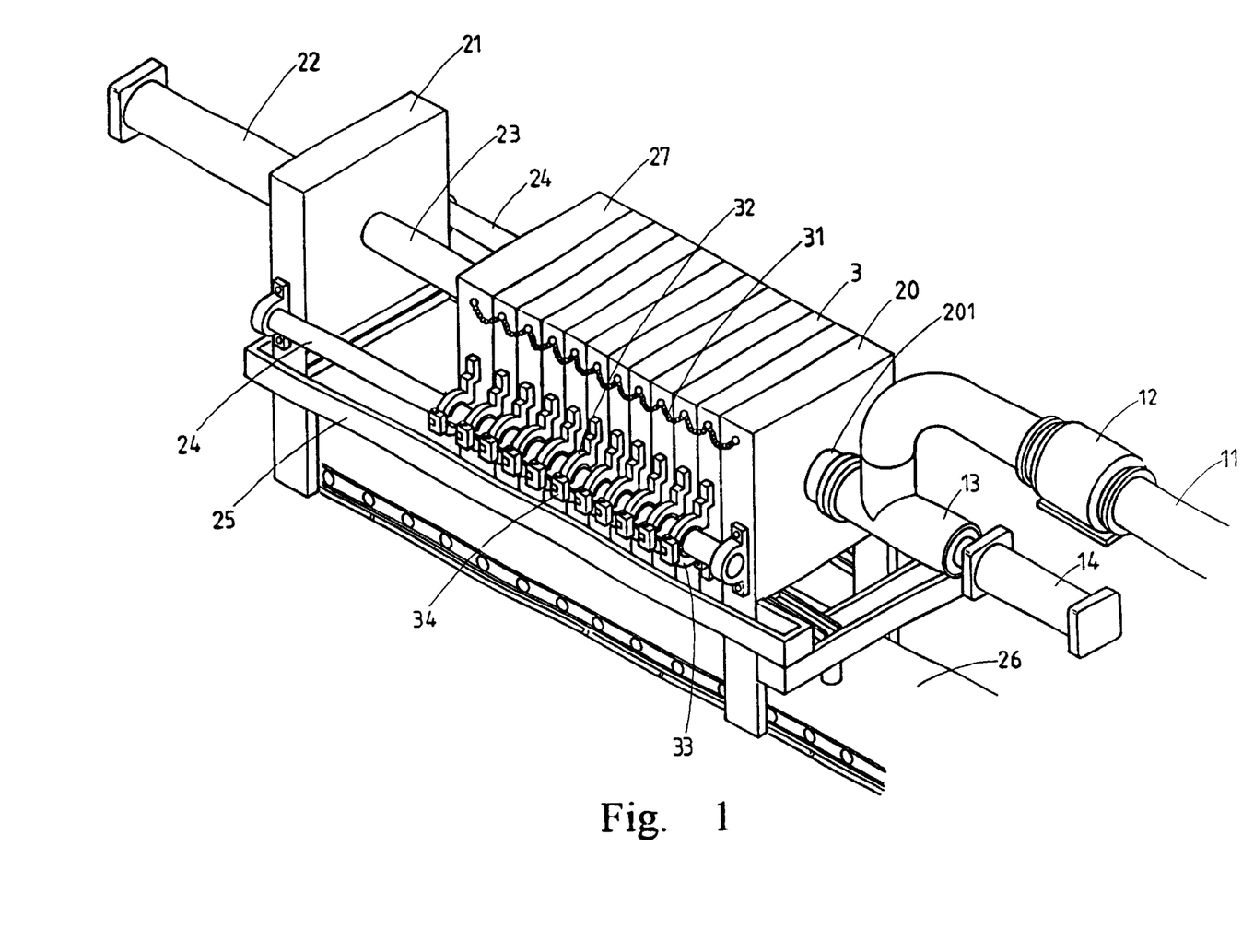
FIG. 1 is a stereoscopic drawing of present invention.
Figure 2:
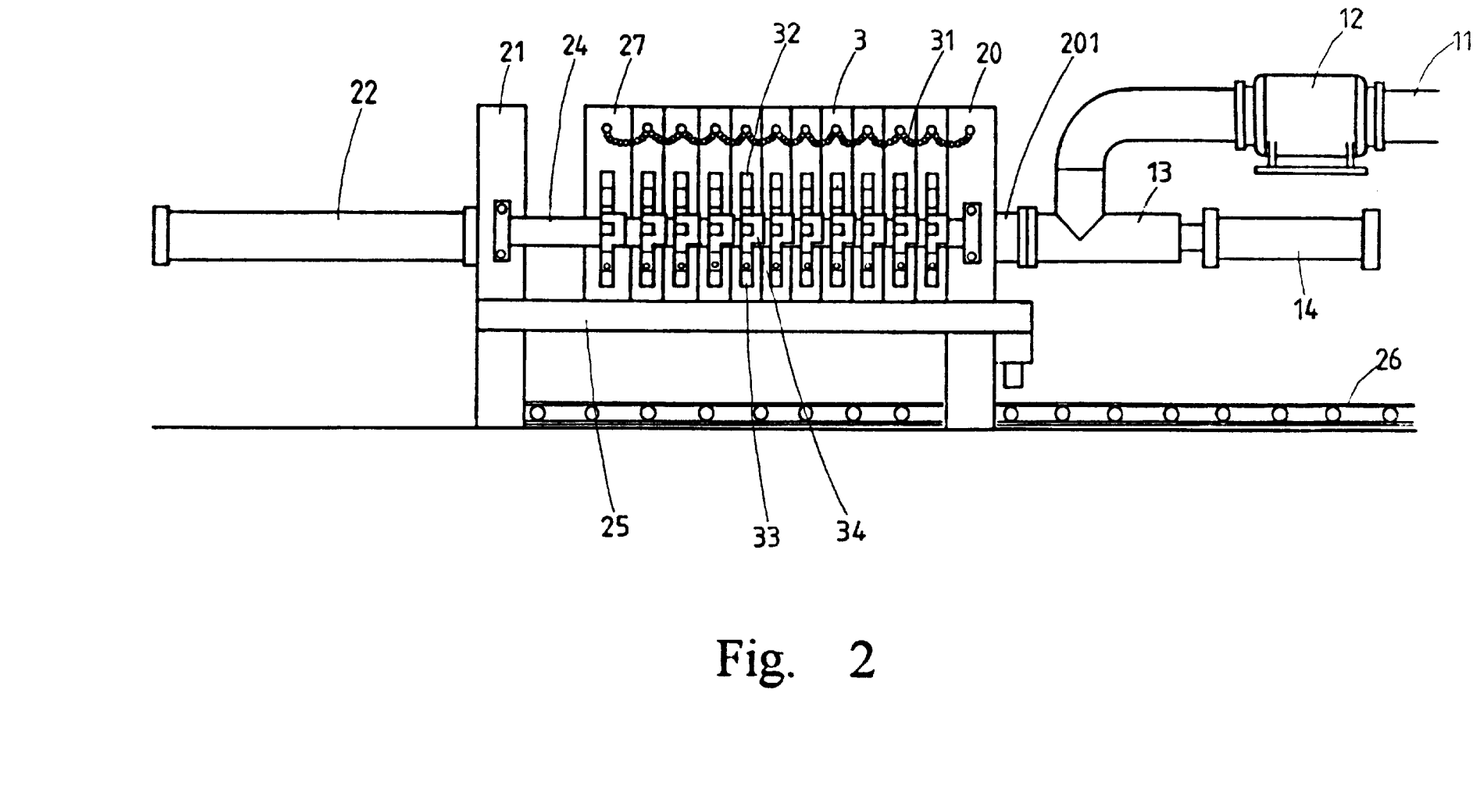
FIG. 2 is a side view showing the structure of present invention.

Please refer to following example together with drawings for the structure and functions of present invention:

As shown by FIG. 1 and FIG. 2, the present invention of a plate type of continuous injection mold machine consists of conveyance pipe 11, pump 12, inlet pipe 13, injection device 14, first mechanical plate 20, second mechanical plate 21, Open-plate and plate control device 22, joint bar 23, two tracks 24, two side frames 25, conveyance belt 26, active mechanical plate 27 and several forming plates 3.

Figure 3:
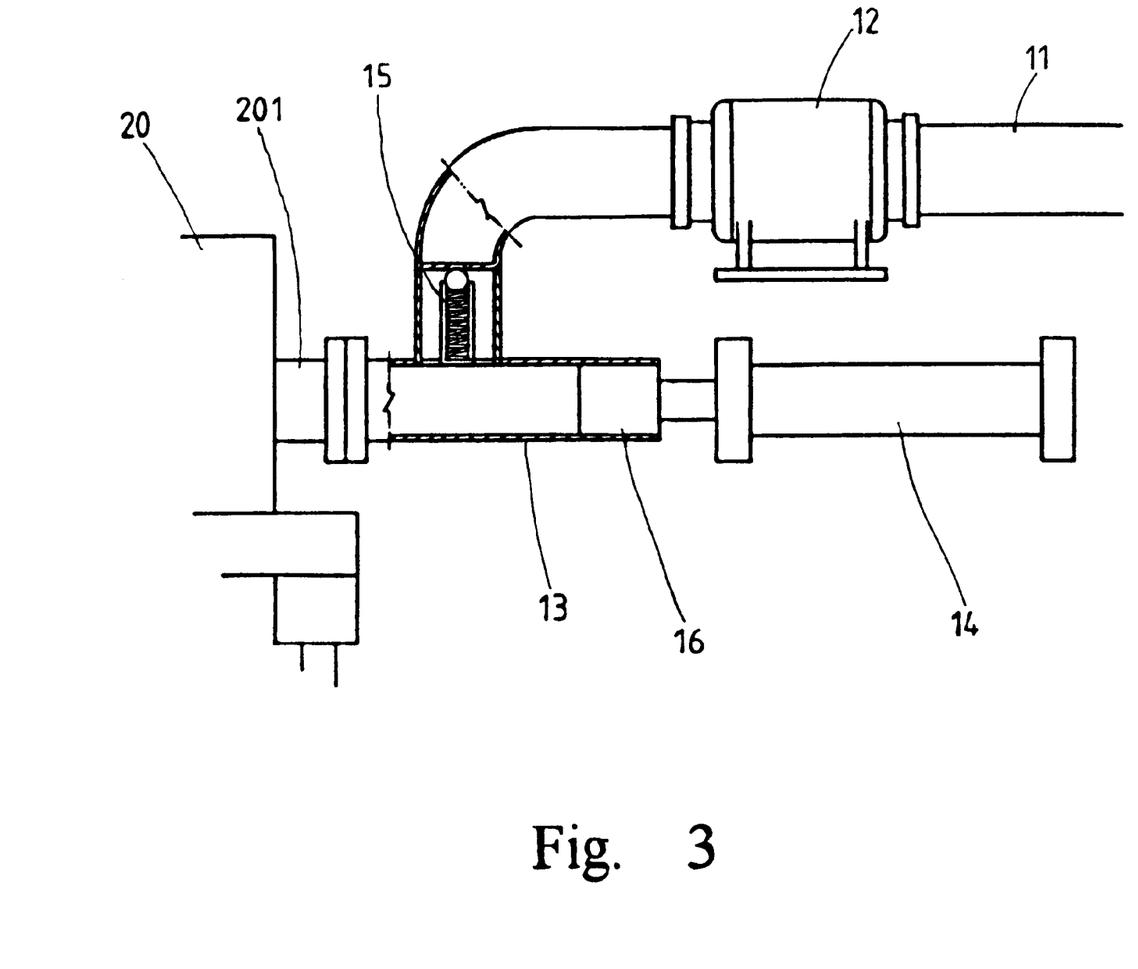
FIG. 3 is a sectional view showing the inlet pipe of present invention.
Figure 4:
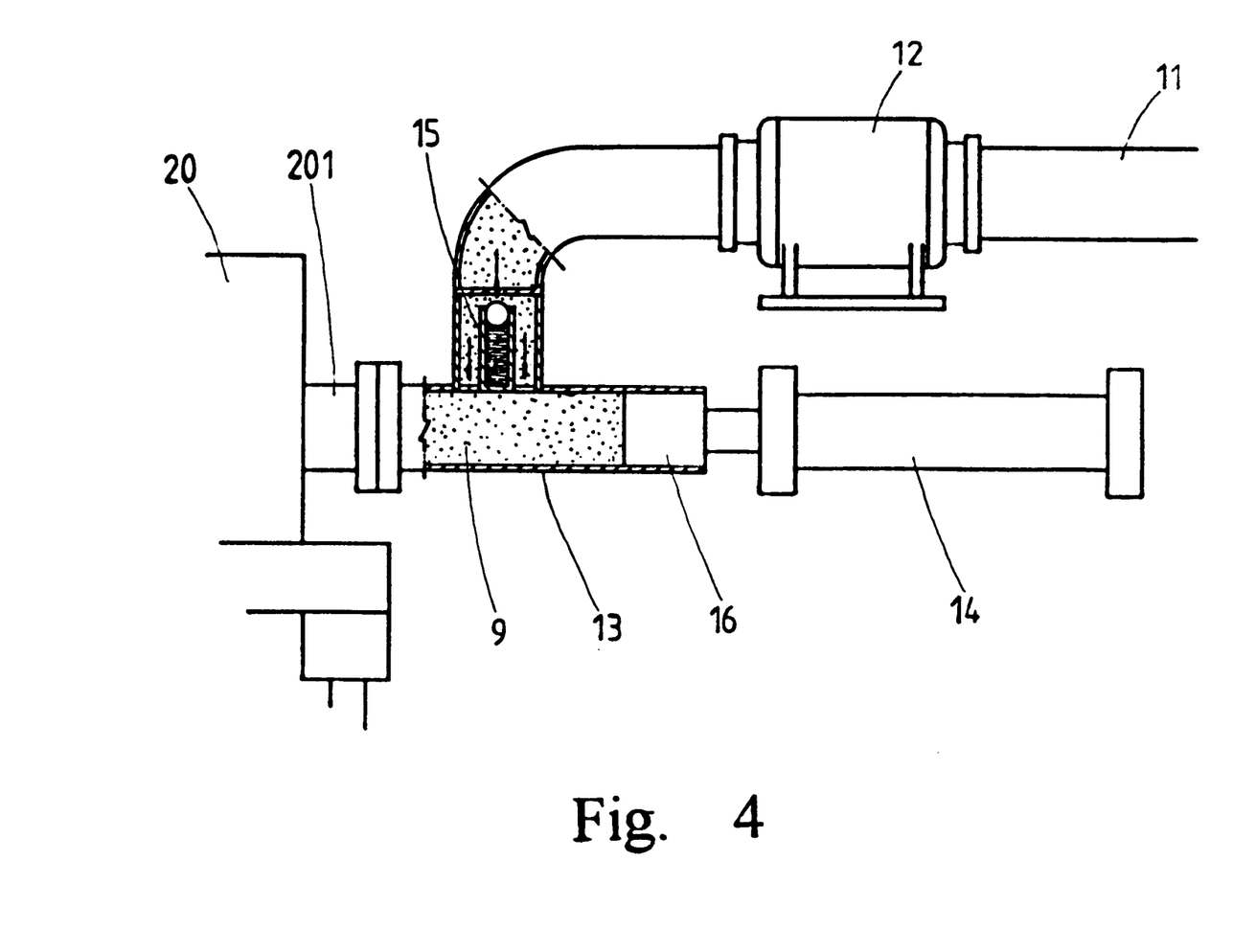
FIG. 4 is a sectional view showing the motion of inlet pipe of present invention.
Figure 5:
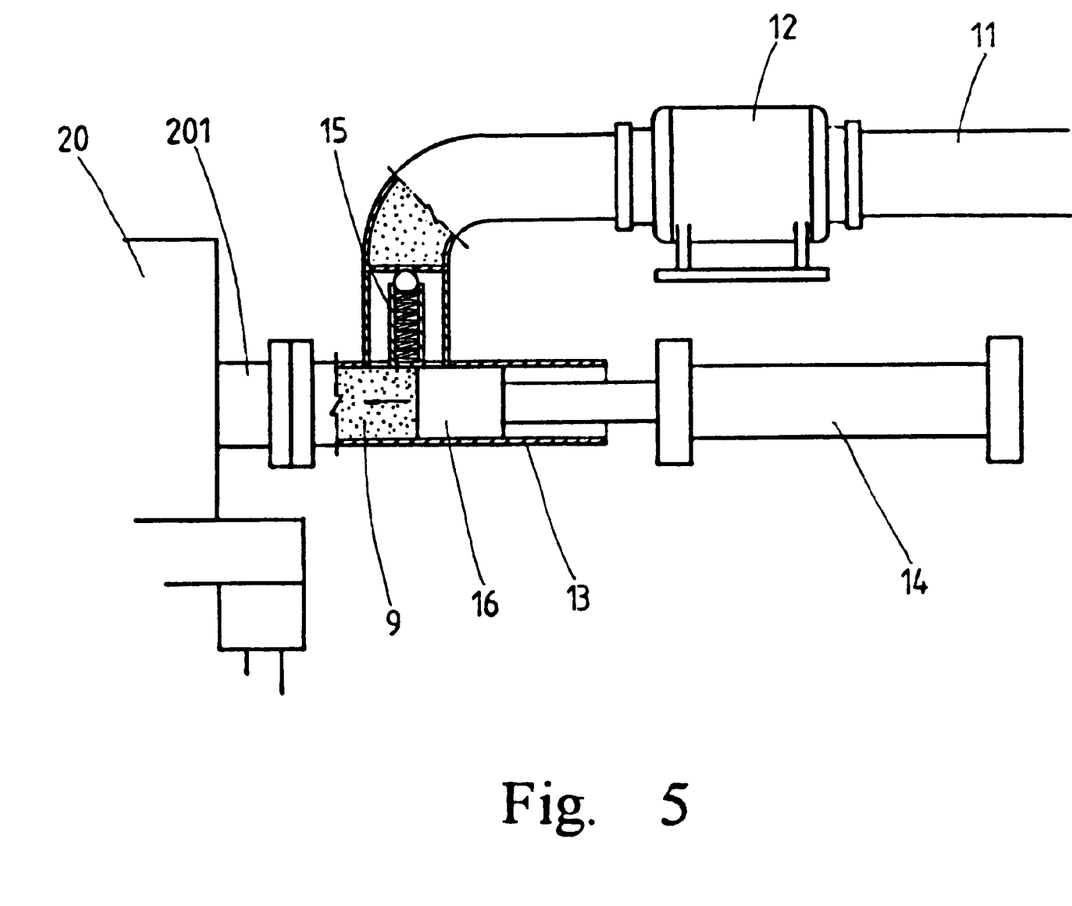
FIG. 5 is another sectional view showing the motion of inlet pipe of present invention.

Regarding the process of inlet of material, there is a pump 12 connecting the rear end of conveyance pipe 11. The pump 12 connects an inlet pipe 13. The inlet pipe 13 is a T-shaped pipe, one end connects the injection device 14, the opposite end connects the material inlet 201 on first mechanical plate 20, while the top end connects another pump 12 for continuous supply of material. Please refer to FIG. 3, a valve 15 may be installed on the joint of the inlet pipe 13 and pump 12. This valve 15 allows inlet of material and restricts outlet of material. Once conveyed into the inlet pipe 13 via pump 12, the pulp 9 cannot return to the pump 12 any longer (as shown by FIG. 4). Due to the function of injection device 14 in the inlet pipe 13, the pulp 9 being transmitted to inlet pipe 13 will be conveyed to the material inlet 201 (as shown by FIG. 5) by the injection device 14. The injection device 14 can be either an air-pressured cylinder that consists of a piston 16 on its joint protracting into the inlet pipe 13.

The first mechanical plate 20, second mechanical plate 21, active mechanical plate 27 and all forming plates 3 are aligned parallel to one another. The first mechanical plate 20 and second mechanical plate 21 are fixed on two corresponding side frames 25. The outer end of second mechanical plate 21 connects to an open-plate and plate control device 22. The joint bar 23 of the open-plate and plate control device 22 protracts through the center of second mechanical plate 21 and connects the active mechanical plate 27. In other words, when the open-plate and plate control device 22 drives the joint bar 23 to expand and contract, the active mechanical plate 27 moves its position accordingly. There are several forming plates 3 between the active mechanical plate 27 and first mechanical plate 20. Chains 31 are installed between all forming plates 3 to facilitate the joint movement of all forming plates 3.

Two tracks 24 are installed horizontally on both sides between first mechanical plate 20 and second mechanical plate 21. In other words, all forming plates 3 are installed in the area surrounded by two tracks 24, first mechanical plate 20 and second mechanical plate 21. All forming plates 3 moves along two tracks 24. This is how it works. Upper-knuckle stand 32 and lower-knuckle stand 33 are installed on both sides of each forming plates 3. The inner surface of upper-knuckle stand 32 and lower-knuckle stand 33 is equipped with arc-shaped washer or bronze ring 321, 331 to match track 24 and facilitate rolling on the track 24. A fastener 34 is installed on the end of upper-knuckle stand. This fastener coordinates the knuckle movement of upper-knuckle stand 32 and lower-knuckle stand 33. The lower-knuckle stand 33 is active and capable of swaying ninety degrees below. All forming plates 3 move as the upper-knuckle stand 32 and lower-knuckle stand 33 move along the track 24. As the lower-knuckle stand can sways below, the forming plate 3 can be placed on the track 24 or removed.

Figure 6:
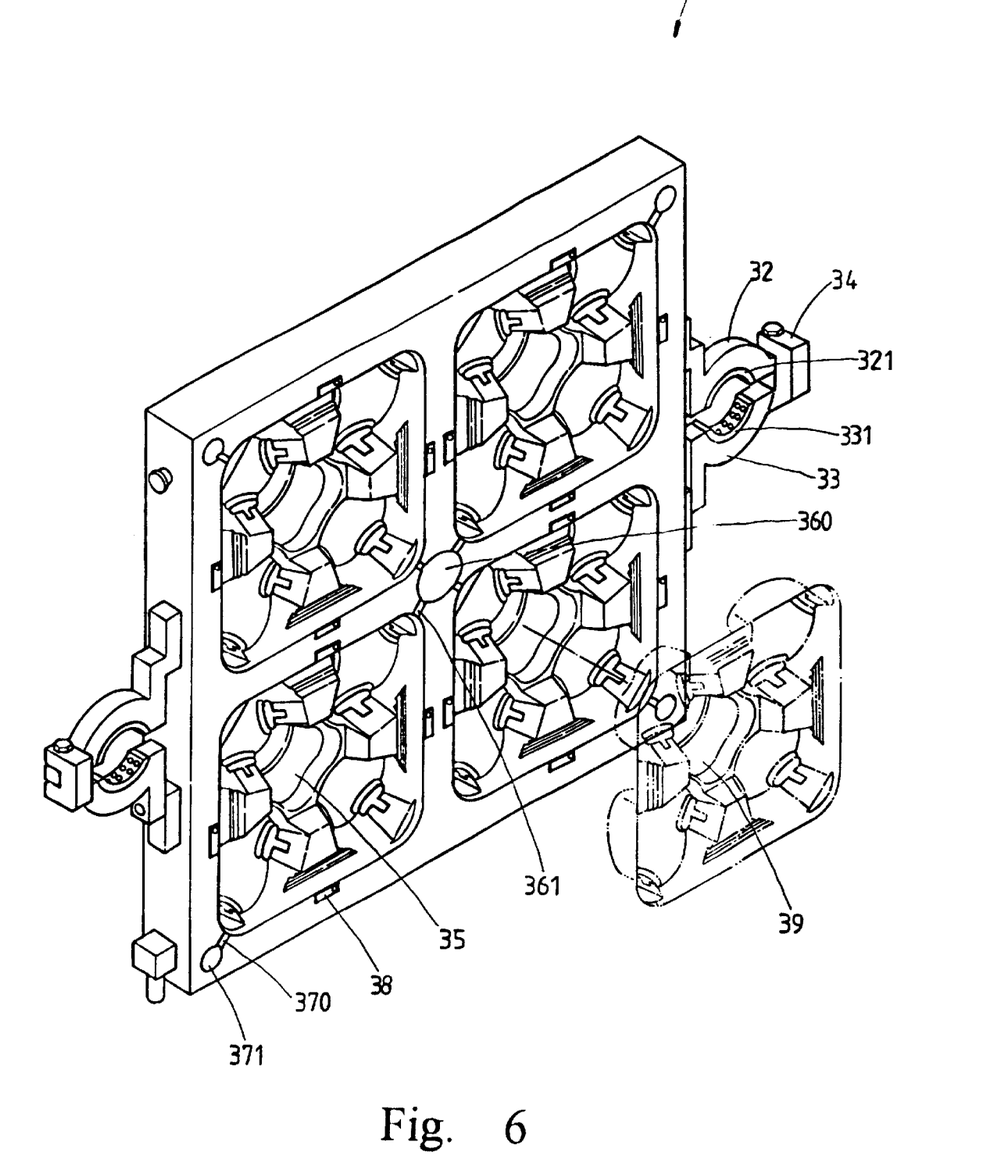
FIG. 6 is the stereoscopic drawing of the forming plate of present invention.

As shown by FIG. 6, there is an injection inlet 360 on the center of forming plate 3. In this example, each piece of forming plate 3 consists of four molds 35. Convex and concave are distributed on the surface of molds 35. Each mold 35 incorporates with a mold plate 39. There is a space between mold plate 39 and mold 35. This space accommodates the pulp 9. The mold plate 39 is assembled on the forming plate 3 and is blocked by several blocking plates 38. There is a gutter 361 between injection inlet 360 and mold 35. There is a drainage pipe 370 on the edge of all molds 35 connecting a spillover outlet 371.

Figure 7:
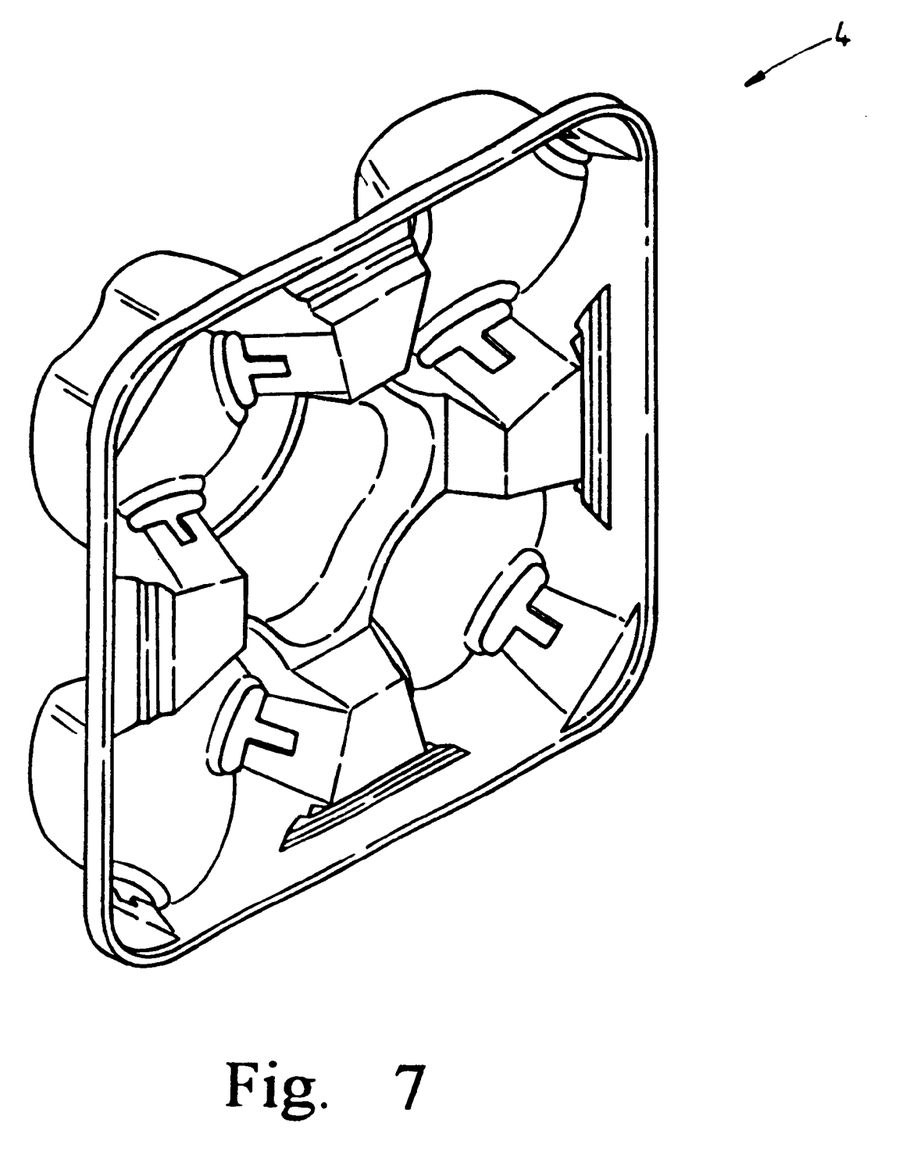
FIG. 7 is the stereoscopic drawing of small-sized product manufactured by present invention.
Figure 8:
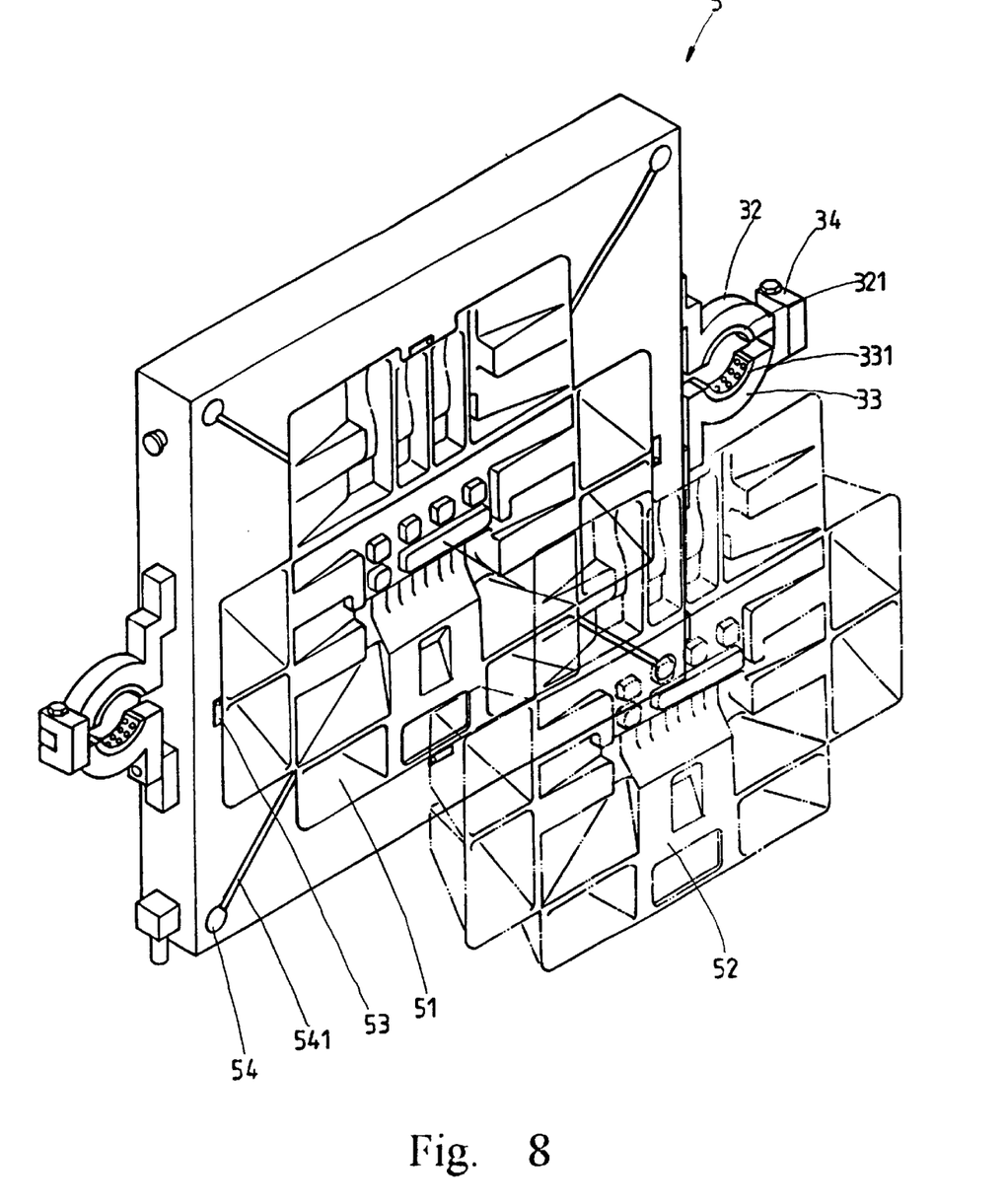
FIG. 8 is another stereoscopic drawing of forming plate of present invention.

As the forming plates 3 are adjacent to one another, the injection inlets 360 of all forming plates 3 connect to one another and the material inlet 201. Once entering into the material inlet 201, the pulp 9 will continue entering into the injection inlets 360 of each forming plate 3, then entering into the space between all molds 35 and mold plates 39 via gutter 361. As pump 12 continues injecting pulp 9 into the machine, the pulp 9 located in the space between molds 35 and mold plates 39 is pressed tighter and tighter, and dehydrated gradually, eventually the small-sized finished products 4 shown by FIG. 7 are produced. To pick up the small-sized finished products 4, the open-plate and plate control device 22 drives the joint bar 23 to contract outward in order to activate the active mechanical plate 27 to separate all forming plates 3 by chains 31, then pick up the small-sized finished products 4.

To ensure that the pulp 9 completely fills the mold, the present invention includes drainage pipe 370 and spillover outlet 371. As soon as the mold 35 and mold plate 39 is full of pulp 9, the extra pulp 9 will be discharged. Without the drainage pipe 370 and spillover outlet 371, the pulp 9 would not completely fill the mold 35 and mold plate 39.

Figure 9:
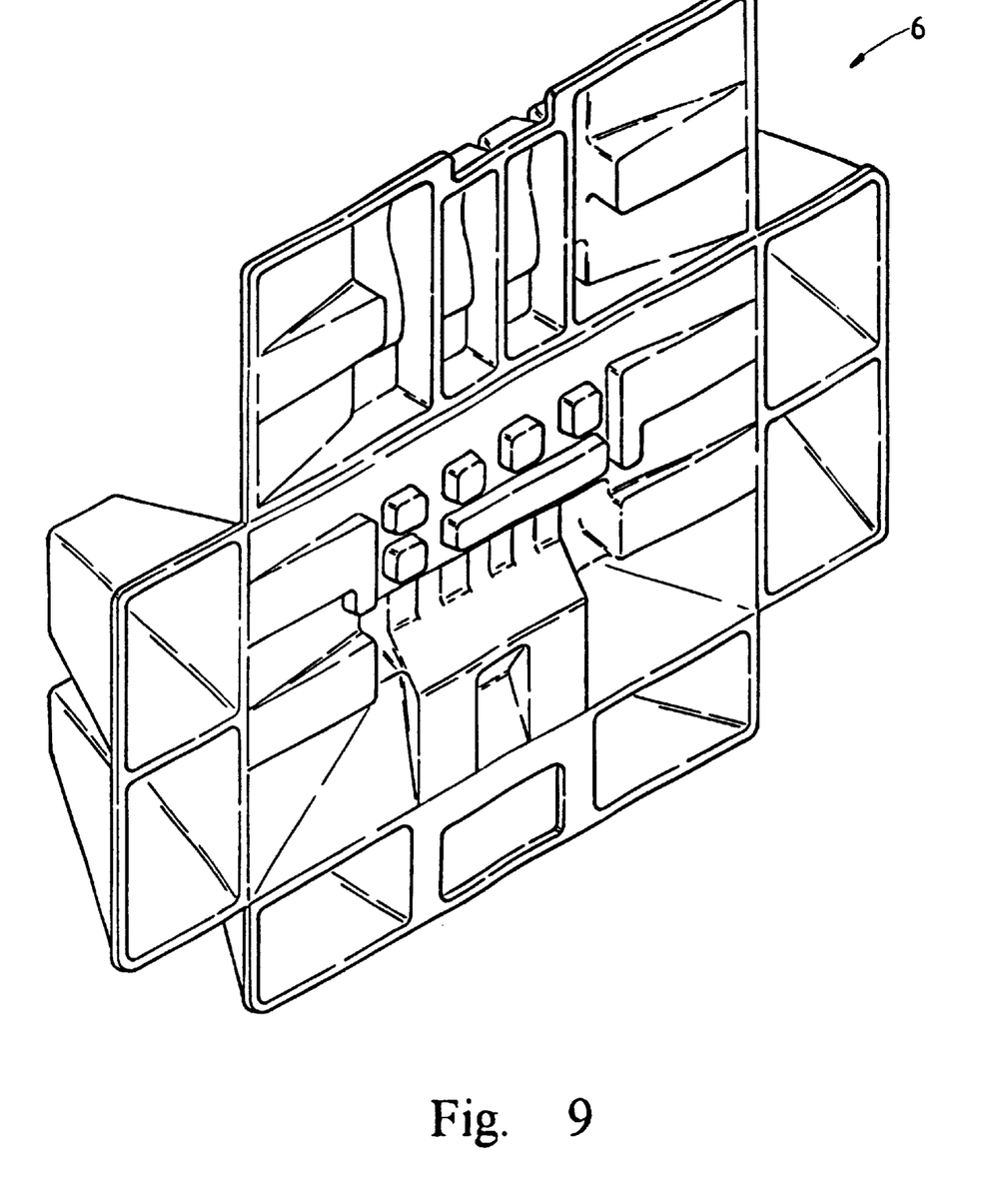
FIG. 9 is the stereoscopic drawing of large-sized product manufactured by present invention.

FIG. 6 shows an example of producing four pieces of small-sized finished products 4 by a forming plate 3. To product a large-sized finished product 6 by a forming plate 3, please refer to FIG. 9. Same molds 51 are installed on the forming plate 5 with an additional mold plate 52. The mold plate 52 is fixed by several blocking plates 53, too. The pulp 9 is conveyed via the injection inlets 54 and gutter 541 on four corners. The large-sized finished products 6 are shown by FIG. 9.

Figure 10:
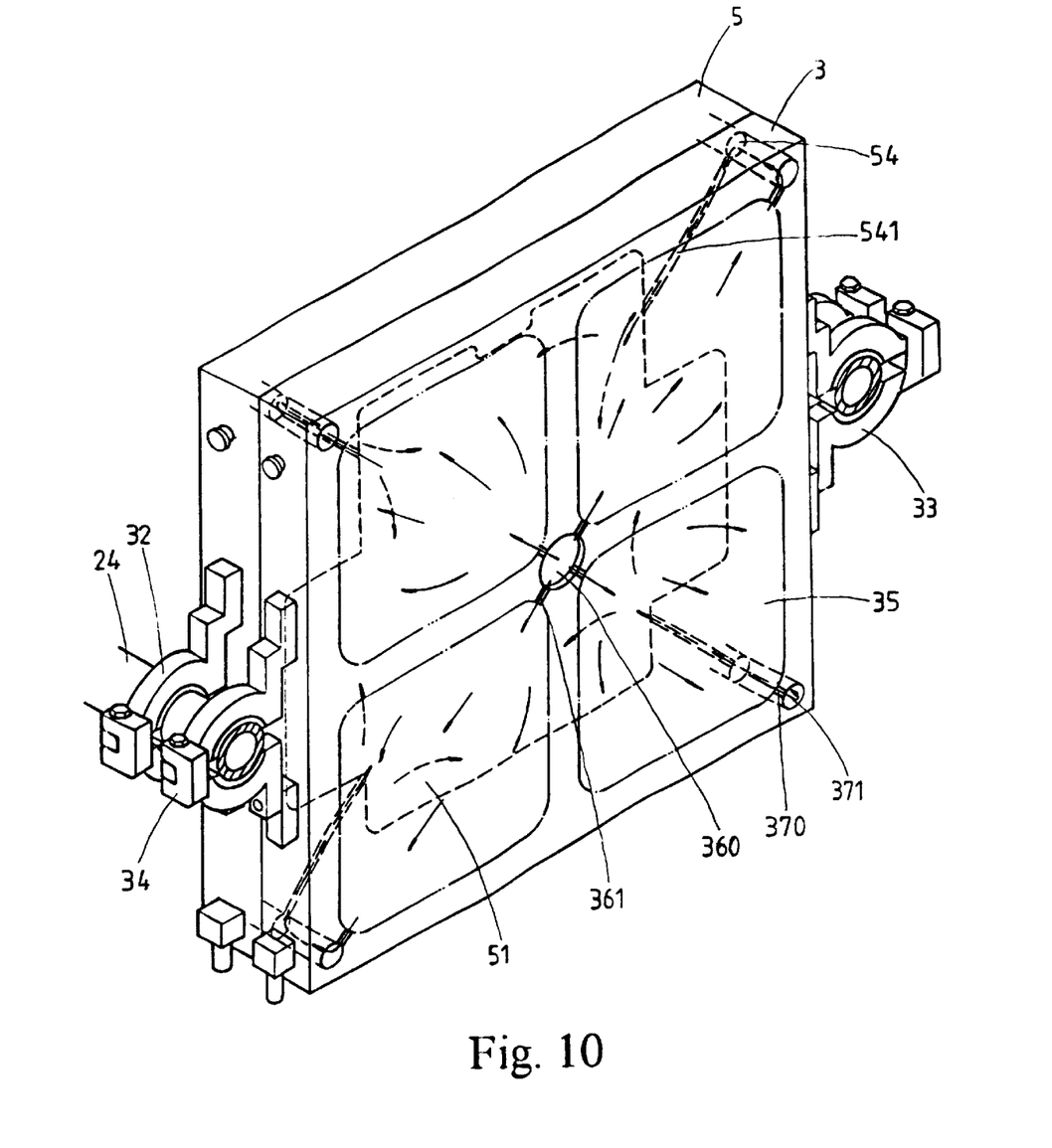
FIG. 10 is the flowchart of pulp in the forming plate of present invention.

The present invention is capable of producing large-sized finished products 6 and small-sized finished products 4 simultaneously. Overlap the forming plate 5 and forming plate 3 together as shown by FIG. 10, the pulp 9 enters into through the injection inlet 360 of forming plate 3, runs through gutter 361 to the molds 35, then runs through the drainage pipe 370 and spillover outlet 371 to the injection inlets 54 on four corners of a forming plate 5 in the rear, and then flow into the mold 51 via gutter 541.

Figure 11:
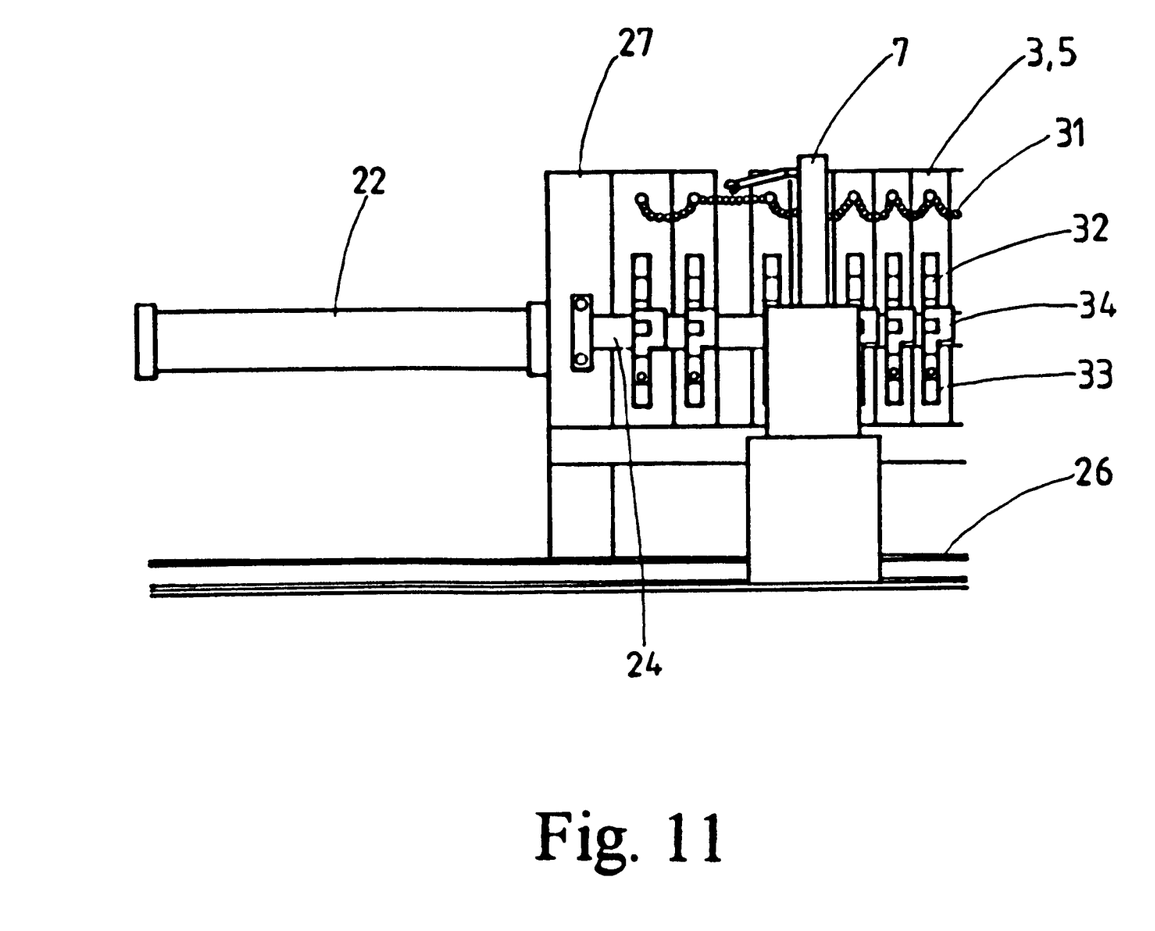
FIG. 11 is the drawing of present invention with robotic arm.

FIG. 11 shows that the finished products manufactured by present invention can be either picked up by robotic arm 7 or conveyed by the conveyance belt 26 on the bottom.

Figure 12:
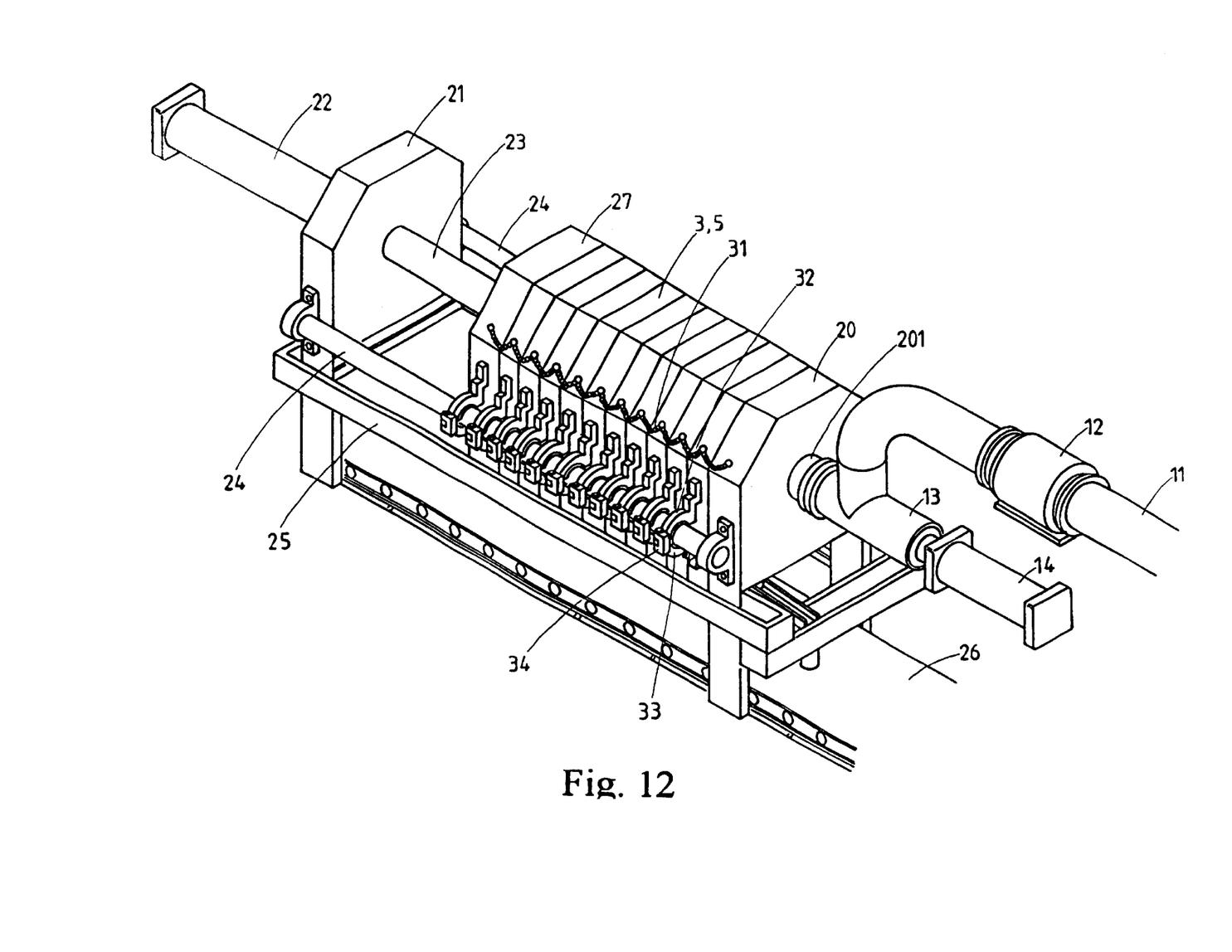
FIG. 12 is another stereoscopic drawing of present invention.
Figure 13:
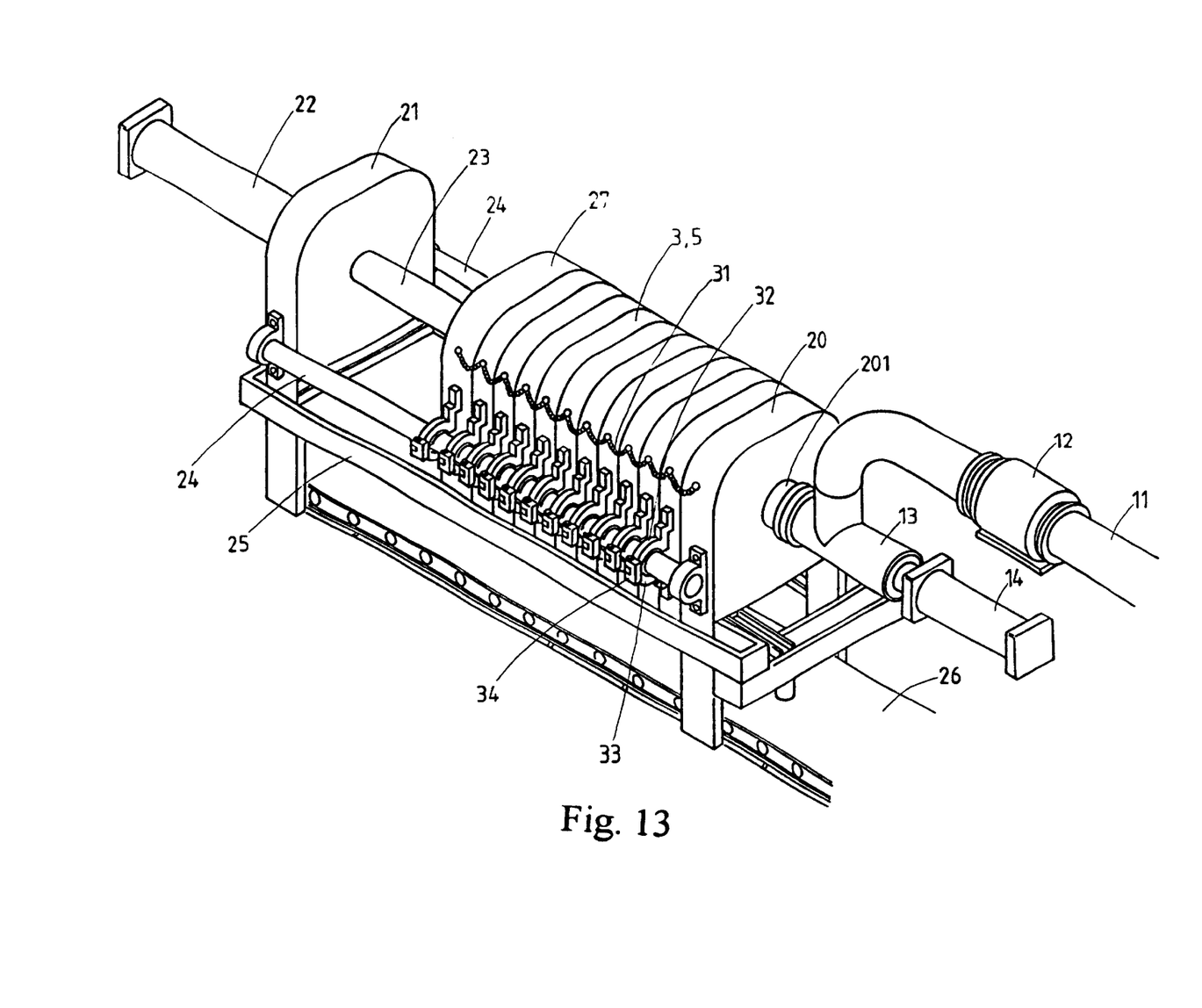
FIG. 13 is one more stereoscopic drawing of present invention.

FIG. 12 and FIG. 13 indicate that the forming plates 3,5 can be made in the shape based on actual needs. Naturally, the quantity and size can be decided according to actual needs as well.

Based on the preceding statement, the present invention of "a plate type of continuous injection mold machine" manufacturers products by injecting and pressing the pulp material in the molds. This method has a number of advantages. The present invention's nature of progress and usefulness is obvious and has never been disclosed in any patent bulletins before. As such, the present invention has fully complied with the requirement of new patent. The inventor hereby submits the application for patent and prays for thorough review of present invention in connection with the permission of patent.

Having thus described the invention, what the inventor claims as new and desire to be secured by Letters Patent of the United States include:

1. A continuous injection mold machine comprising:

a conveyance pipe, a pump, inlet pipe, an injection device, a first mechanical plate, a second mechanical plate, an open-plate and plate control device, an active mechanical plate, two tracks, two side frames, a plurality of chains, and a plurality of forming plates; wherein said inlet pipe is T-shaped with a first end connected to an injection device, a second end connected to a material inlet on said first mechanical plate, and a third end connected to said pump and said conveyance pipe, said injection device operates a piston in said inlet pipe, said first mechanical plate, said second mechanical plate, said active mechanical plate, and said forming plates are aligned parallel to each other, said second mechanical plate is connected to said open-plate and plate control device, said open-plate and plate control device being connected to a joint bar that penetrates through said second mechanical plate and connects to said active mechanical plate, said forming plates are situated between said active mechanical plate and said first mechanical plate, said chains connect adjacent pairs of said forming plates to each other, and said chains connect a terminal one of said forming plates to said first mechanical plate, said two tracks are located on opposing sides of said forming plates, each said forming plate comprises an injection inlet, at least one mold, and a removable mold plate, there being a space between each said mold and each said mold plate, blocking plates fix said mold plates on said forming plates, there being inlet channels by each said injection inlet, each said inlet channel being in communication with said molds, there being further spillover outlets and spillover pipes on outer edges of said forming plates; such that said mold machine is operated by activating said joint bar of said open-plate and plate control device to press said active mechanical plate and said forming plates toward said first mechanical plate, then injecting pulp through said conveyance pipe into said inlet pipe by means of said pump, then activating said piston of said injection device to inject said pulp into said material inlet, said pulp then flowing into and filling said injection inlets, said mold plates, and said mold as well as said inlet channels until excess portions of said pulp flows to spillover outlets and spillover pipes and flows out of said mold machine.

2. A continuous injection mold machine as in claim 1, wherein:

both sides of said forming plates are equipped with an upper-knuckle stand and a lower-knuckle stand, said upper-knuckle stand and said lower-knuckle strand encircle said tracks to facilitate movement of said forming plate along said tracks.

3. A. A continuous injection mold machine as in claim 1, wherein:

the number of molds in each said forming plate is four.

4. A continuous injection mold machine as in claim 1, wherein:

the number of molds in each said forming plate is one.

5. A continuous injection mold machine as in claim 1, wherein:

said injection device is an air-pressured cylinder.

6. A continuous injection mold machine as in claim 1, wherein:

said injection device is an oil-pressured cylinder.

* * * * *